Feb. 24, 1953 D. S. D. FRASER 2,629,606
VALVE
Filed June 16, 1950 2 SHEETS—SHEET 1
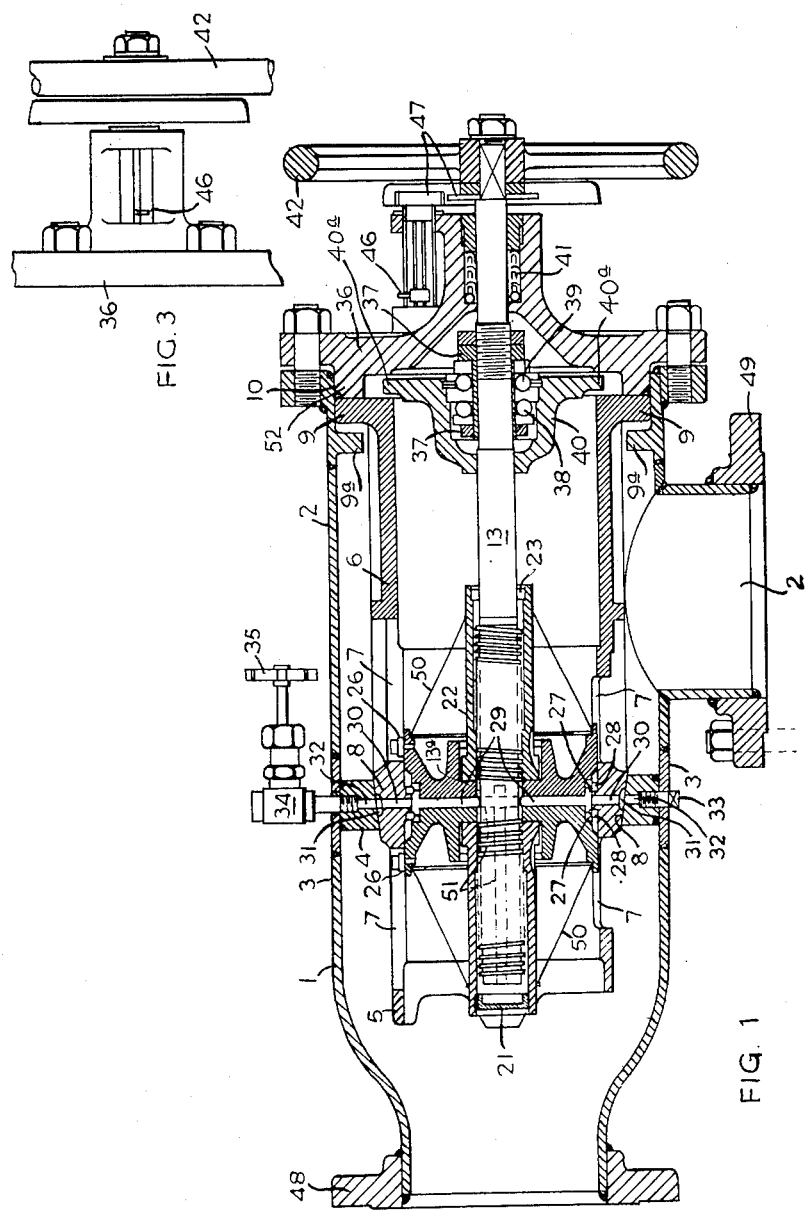
INVENTOR
DONALD STUART DENHOLM FRASER
BY Mock + Blum
ATTORNEYS

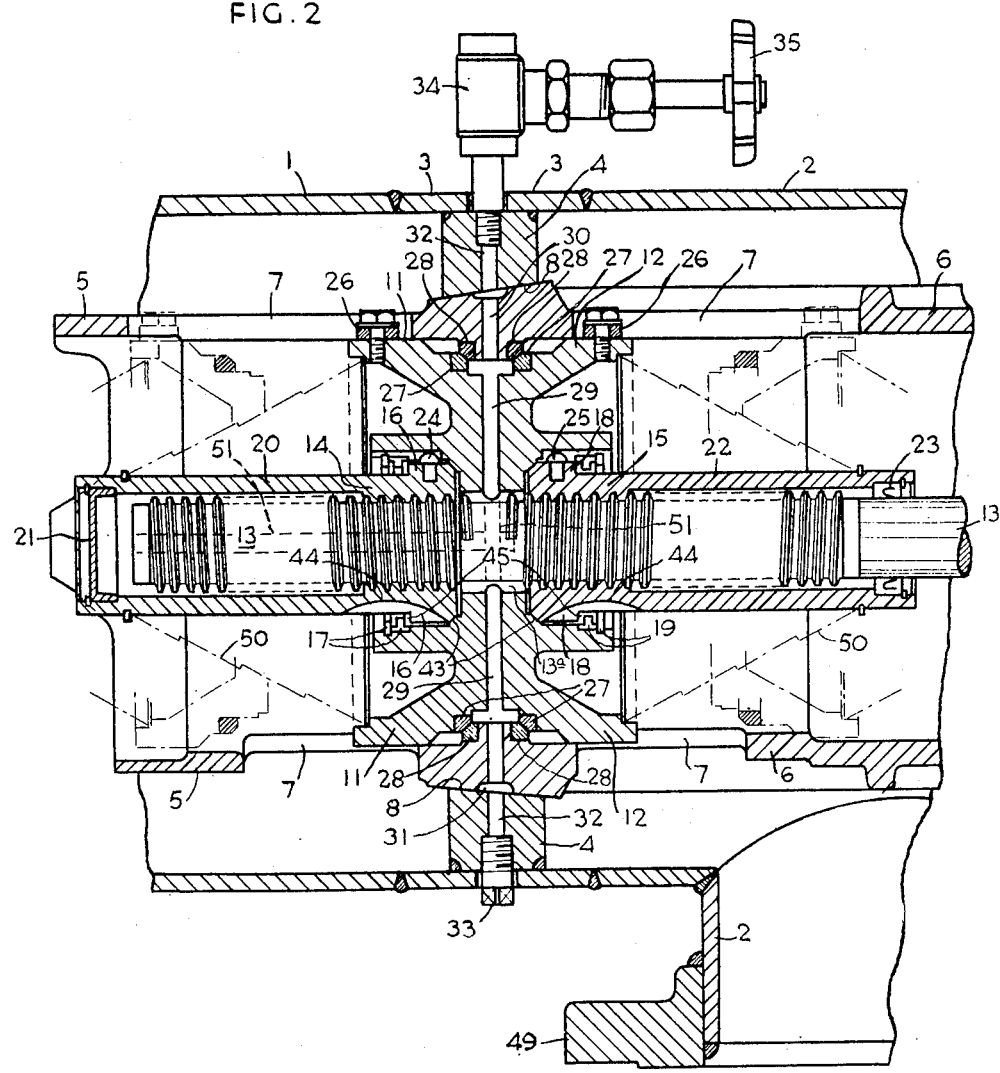

Patented Feb. 24, 1953

2,629,606

UNITED STATES PATENT OFFICE 2,629,606

VALVE

Donald Stuart Denholm Fraser, Garrow,
Longfield, England

Application June 16, 1950, Serial No. 168,394
In Great Britain June 20, 1949

18 Claims. (Cl. 277—36)

The invention relates to a valve for the control of fluid flow, and particularly to a valve capable of segregating fluids with elimination or reduction of the risk of inadvertent mixing of the fluids by leakage through the valve.

When it is desired to segregate fluids, for example, in different sections of a pipe-line, it is conventional practice either to insert so-called blind flanges in the line between two gate valves or to provide a short section of pipe-line between two gate valves and arrange for this short section to be capable of being drained. These arrangements, however, are unsuitable for rapid operation and they not only involve undue employment of labour for their operation and upkeep but are relatively complicated and require a considerable provision of accessory parts, such as flanges, jointing rings and the like. Moreover, the valves after a short period of use lose their tightness and replacements offer other disadvantages.

An object of the present invention is to provide a new or improved construction operative to avoid the above difficulties and to effect the desired segregation with reliability and marked facility.

According to the invention there is provided a valve comprising a casing, divided by one or more inwardly projecting annular flanges into two separate zones and having one or more passages or ducts in the one flange, or between a pair of the flanges, communicating with the exterior of the casing, a ported sleeve-like part in each zone jointed or otherwise fluid-tightly connected to the flange or flanges, the sleeve-like parts being arranged to have communication with each other through the orifice of the flange or flanges and also with said passages or ducts, and movable valve members mounted one in each sleeve-like part and operative to cover and uncover the ports in such parts.

The construction suitably further is such that the movable valve members are operative not only to control the ports in the sleeve-like parts but also to apply a closure across the orifice of the flange or flanges after the ports are closed thereby.

Advantageously, the end of the passages or ducts of the flange or flanges, on the outside of the casing, may be sealed by a valve or a removable plug or by a combination of both.

Preferably, the said valve members are of piston shape and provided with means for effecting their simultaneous movement in opening and closing the ports. More particularly, it is preferred that such valve members be actuated by a spindle formed with a left-hand thread and with a right-hand thread, each thread engaging a nut for moving a respective valve member, and each nut being restrained from rotation, whereby turning of the spindle effects linear movement of the valve members in opposite directions.

Preferably, the sleeve-like parts and the peripheral surface of said movable valve members are of cylindrical form. Preferably, also the sleeve-like parts are embodied in a single sleeve-like member jointed to the inwardly projecting annular flange or flanges of the valve casing.

The arrangement is also advantageously such that the said sleeve-like member, movable valve members, nuts and valve spindle are insertable into and removable from the valve casing as a unit. For this purpose, the sleeve-like member and the inwardly projecting annular flange or flanges of the casing may advantageously be engaged with one another by coned surfaces on each of a character to allow relatively ready engagement or disengagement.

Alternatively, the engagement may be by stepped surfaces sealed by gaskets or rings. In addition, the sleeve-like member may be extended to an opening of the valve casing and externally flanged to fit within that opening which is closed by a cover plate designed to hold the sleeve-like member in engagement with the internal flange or flanges of the valve casing. Means may be embodied in such flange of the sleeve-like member to break joint or connection of that member with the internal flange or flanges of the valve casing, and thus facilitate removal of the sleeve-like member when desired.

The oppositely movable valve members suitably have surfaces at one end which mate in the closed position of the valve with seatings within the orifice of the inwardly projecting annular flange or flanges of the valve casing, the mating surfaces being contoured to provide a seal, or one or both mating surfaces being provided with a sealing ring to effect a seal.

According to a preferred form of construction each movable valve member is engaged at its other or rear end with an annular shoulder upon its aforesaid nut and this annular shoulder is suitably provided with a short free traverse with respect to the co-operating movable valve member at the beginning of the opening movement of such movable valve member to act as a pilot valve allowing access of fluid to the space between the movable valve members past the aforesaid mating surfaces whereby the pressure across the movable valve members can be balanced. A radial projection on the shoulder may be engaged within a groove or slot provided in the movable valve member and a similar projection on such valve member be disposed to slide within a longitudinal groove or slot in, or a port of, the surrounding sleeve-like part or member to prevent rotation of the nut and movable valve member.

The valve spindle may be provided with a thrust ring and bearing means disposed in a housing which is free to float to a limited extent axially of the spindle in order to allow the pressure exerted by the left and right hand threads on the movable valve members, through the nuts, to be compensated and thus equalise the pressure of the movable valve members at their respective mating surfaces aforesaid. The valve spindle may extend through the wall of the casing and be provided at the thus extending, or outer, end with a hand wheel or a mechanically operated rotating device. The free or inner end of the valve spindle, that is to say the end remote from rotating means thereof is encased in a tubular cover, suitably provided by an extension on the nut at that end, adequate clearance being provided for movement of fluid between the spindle and the cover on operation of the valve. The other nut suitably has a similar tubular extension over the spindle, also having adequate clearance for fluid movement and housing a seal between it and the spindle at the end remote from the nut.

The extent of traverse of the movable valve members on opening of the valve may be limited in any convenient manner, for example, by abutment of one of said nuts against the housing which encloses the aforesaid thrust ring and bearing means.

The valve casing may be constructed in one or more parts. Preferably the inwardly directed annular flange or flanges is or are situated at the junction between a tubular casing section and a T-shaped casing section, the spindle passing across the head of the T-section and extending through a cover plate thereof. Alternatively, the flange or flanges may be situated at the junction between two tubular casing sections, in which event a short spindle could be set at 90° to the main axis of the valve and be arranged to rotate the left and right hand threaded spindle by means of bevel gears or the like. This would allow the inlet end of the valve casing to be on the same axis as the outlet end.

The invention is diagrammatically illustrated by way of example with reference to the accompanying drawings in which:

Fig. 1 shows a leak indicating valve in longitudinal section,

Fig. 2 is a fragmentary portion of Fig. 1 to a large scale, and

Fig. 3 is a fragmental plan illustrating a detail.

In the drawings, a valve casing of welded construction comprises a tubular section, a T-section 2 and an interposed section 3 carrying an inwardly projecting annular flange 4 serving to divide the casing into two zones one on either side of the flange. If desired, the casing section 3 could be made in two parts and the flange 4 be constituted by two flanges butted and fastened together. A sleeve-like member, comprising the sleeve-like parts 5 and 6 disposed on opposite sides of the flange 4 and each formed with several ports, such as 7, spaced around it, is secured at a coned part 8 in the correspondingly coned orifice of the flange 4. The sleeve 5, 6 extends further to the right than to the left, of the flange 4 in Fig. 1 and at the end has an external flange 9 which fits in the opening 10 of the valve casing and centralises the sleeve. The sleeve-like parts 5 and 6 form cylinders within which slide movable valve members 11 and 12 respectively formed like pistons and hereinafter referred to as pistons for convenience. It will be realised that the coned surface at 8 allows the sleeve-like member 5, 6 readily to be engaged with and disengaged from the flange 4 while providing a simple leak-proof connection. The disengagement may be effected for instance by tacking screws (not shown) provided in the flange 9 and operative to bear upon an inner annular flange 9a of the valve casing. A spindle 13 passes with clearance 13a centrally through the pistons, and carries nuts 14 and 15 upon right-hand and left-hand threaded sections thereof respectively as shown. The nut 14 is formed with a shoulder 16 which extends with a short longitudinal play into a recess formed in the rear face of the piston 11 and is held therein by the rings 17, Fig. 2. The nut 15 is similarly provided with a shoulder 18 which extends with similar play into a recess formed in the rear face of the piston 12 and is held therein by the rings 19. The inward ends of the nuts 14 and 15 are formed with coned seating surfaces at 43 to engage with complementary coned seatings in the respective pistons 11 and 12 when the spindle 13 is operated to close the valve. The nut 14 is formed to provide a rearwardly-extending tubular cover for the free end of the spindle 13. This cover comprises an extension 20 of the nut and a closure 21 for such extension. The other nut 15 has an extension 22 to form a tubular cover for the threaded part of the spindle 13 shown projecting rearwardly beyond the nut and this extension contains a seal 23 for the spindle, The covers have appropriate clearance about the spindle for purpose aforesaid. Studs or pins 24 and 25 are mounted to extend radially from the nuts 14 and 15 respectively to project into grooves provided at corresponding positions in the pistons 11 and 12 respectively. The pistons in turn have secured to them blocks 26 which slide in the ports or slots 7 in the sleeve-like member 5, 6. Chamfered sealing rings 27 of metal, tough resilient rubber, or other appropriately resistant material are provided in grooves in the forward ends of the pistons 11 and 12 to engage with similar rings 28 provided in the sleeve-like member 5, 6 at the circumference of an enclosed narrow annular space 29 formed between the forward end faces of the pistons in the closed position of the latter. The sleeve-like member 5, 6 is drilled radially and recessed at 30 and 31 respectively, to form several ducts connected to the space 29 and these continue in the form of ducts 32 drilled in the flange 4 or formed in and between the flanges if two of the latter are used as aforesaid. Each of the ducts 32 is sealed at the outer ends either by a drain plug such as 33 or by a test cock such as 34 operated by handle 35. One end of the spindle 13 extends through a cover plate 36 mounted on the casing section 2 to close the opening 10. This cover plate has a flange 52 which bears on the flange 9 of the sleeve-like member 5, 6 to hold the latter securely in contact at 8 with the internal flange (or flanges) 4 of the valve casing. The spindle 13 is provided with thrust rings 37, mounted to engage bearings 38 and 39 carried in a housing 40, and with a seal 41 in the cover 36 and a hand wheel 42. The housing 40 is free to float to a limited extent axially of the spindle 13 for the purpose aforesaid. The extent of the floating is determined by the clearance between the flange 40a of the housing and the ports on either side thereof, see Figure 1.

When the valve is closed, the chamfered sealing rings 27 at the forward ends of the pistons 11 and 12 abut against the co-operating sealing rings 28 in the sleeve-like member 5, 6. Thus, in addition to the closure of the valve at the ports 7 there is also applied a closure across the orifice of the annular flange (or flanges) 4. Because the ports 7 are relatively long, the pistons exert an advantageous throttling action at these ports and this reduces wear of the seating surfaces at 27, 28. To open the valve, the wheel 42 is rotated to cause simultaneous movement of the nuts 14 and 15 outwardly and in opposite directions upon their respective threads on the spindle 13, rotary movement of the nuts being prevented by the studs or pins 24, and the blocks 26 aforesaid. In the opening movement, the nut shoulders 16, 18 exert pressure against the respective rings 17, 19 in the aforesaid recesses in the rear of the pistons 11 and 12, forcing the latter apart and uncovering the ports 7, so that fluid can pass from one zone to the other of the valve casing through the ports and the then increased space between the pistons. Because, at the commencement of the opening movement of the valve, the gaps at 45 between the nut shoulders and the rings 17, 19 are designed to close, slots 44 are cut in the nuts to allow passage of fluid to the space in the piston recesses about the nut shoulders. The latter have only limited end motion with respect to the pistons but that motion allows disengagement of the coned seatings at 43 and thus fluid is able to pass, via the clearance 13a to the space 29 between the pistons, right from the commencement of the opening movement of the valve, to balance the fluid pressure on either side of the pistons. The nut shoulders and the seatings at 43 thus perform the function of a pilot valve. The fully open position of the movable valve members 11, 12 is indicated by dot-and-dash lines in Fig. 2 in which position the extension 22 on the nut 15 suitably abuts against the inner end of the housing 40. Reversal of the spindle 13 causes the nuts 14 and 15 to travel inwards, and on engagement of them with the pistons 11 and 12 at the coned bearing surfaces at 43, the pistons move towards each other to close the ports or slots 7 and eventually bed against the seating rings 28.

A screw-traversed pointer 46, Figs. 1 and 2 is operated by gearing 47 from the spindle 13 to indicate the condition of opening or closing of the valve.

The presence or absence of any fluid in the test cock or cocks 34 and at the drain plug or plugs 33 when the valve is closed shows whether or not there is any leakage from either side of the valve into the space between the pistons.

The valve may be connected in a pipe line by the flanges 48 and 49 and conical strainers or filters 50 may be provided over the rear end of the pistons as shown. The ducts 51 in the spindle 13 allow the fluid to escape from the cover 20 when the valve is closed.

The valve according to the invention is intended primarily for use in the control of liquids, particularly oils. The valve is most suitable for the control of the movement of liquids in large diameter pipe lines operating under relatively low pressures of the order of 150–300 lbs. p. s. i.

A valve constructed according to the invention avoids disadvantages of the prior gate valve arrangements and has the advantage that even a small leakage is readily detected by the presence of fluid at the drain plug and test cock devices 33, 34. Furthermore, provided one or other or all of these devices is or are left open, the removal of fluid leaking through the valve is effected without any possibility of fluids mingling across the valve. Furthermore, the valve does not take up undue space and it provides a ready means of sampling fluid while in transit through the valve. The valve may also be employed as a stop valve on tanks, the test cock or cocks being sealed in open position, with the additional assurance that the valve cannot be employed without this fact becoming apparent. The valve according to the invention, particularly in the form illustrated with reference to the accompanying drawings, is easily manufactured, the necessity for special tools and castings being practically eliminated. Replacements are relatively readily effected and may require only a small stock of spare parts to enable many valves of various sizes to be reconditioned.

In the construction shown in the drawings, the sleeve-like member with the pistons, nuts, screwed spindle and associated parts can be removed from the valve casing as a unit, and replaced as a unit, through the opening 10, and such units can be conveniently assembled and kept in storage ready for use as required. The moving elements of each side of the valve do not require machining to fine limits and they are interchangeable in assembly. Furthermore, whole assemblies are interchangeable in valve casings in the same range. It will also be understood that moving parts of the valve can be replaced without breaking the connection of the valve casing to the pipe line. The valve can be used efficiently in partly open position or for throttling the flow of fluid if desired and its parts can be assembled and its fitting effected without employment of highly skilled labour or undue personnel.

What I claim is:

1. A valve comprising a casing having an internal space and provided with an inwardly projecting annular flange defining an orifice and dividing said space into two zones, said flange having one or more passages formed therethrough establishing communication between the exterior of said casing and said orifice, a sleeve-like member disposed fluid-tightly in the orifice of said flange and formed with ports on opposite sides of said flange in said zones and with one or more openings communicating between the interior of said member and said passages, a pair of movable valve members disposed in said sleeve-like member one on each side of said openings, and valve-operating means operatively connected to said movable valve members to effect linear movement thereof in opposite directions to cover and uncover said ports.

2. A valve according to claim 1, wherein said movable valve members are constructed not only to control the ports in the sleeve-like parts but also to apply a closure across the orifice of said flange after the ports are closed thereby.

3. A valve according to claim 1, including relievable closure means for each end of said passages which is on the outside of said casing.

4. A valve according to claim 1, wherein the valve-operating means comprises a spindle formed with a left-hand thread and with a right-hand thread, respective nuts engaged with said threads and operatively connected to respective said movable valve members and means for restraining rotation of said nuts whereby turning of said spindle effects linear movement of said movable valve members in opposite directions.

5. A valve comprising a casing having an internal space and provided with an inwardly projecting annular flange defining an orifice and dividing said space into two zones, said flange having one or more passages formed therethrough establishing communication between the exterior of said casing and said orifice, a sleeve-like member disposed fluid-tightly in the orifice of said flange and formed with ports on opposite sides of said flange in said zones and with one or more openings communicating between the interior of said member and said passage, a pair of movable valve members disposed in said sleeve-like member one on each side of said openings, a spindle formed with a left-hand thread and a right-hand thread, respective nuts engaged with said threads and operatively connected to respective said movable valve members and means for restraining rotation of said nuts whereby turning of said spindle effects linear movement of said movable valve members in opposite directions to cover and uncover said ports.

6. A valve according to claim 5, wherein said sleeve-like member, said movable valve members, said nuts and said spindle are combined in a unit insertable into and removable from the valve casing through an opening of said casing.

7. A valve according to claim 5, wherein said sleeve-like member, movable valve members, said nuts and said spindle are combined in a unit insertable into and removable from the valve casing through an opening of said casing, said member and the inwardly projecting annular flange of said casing being engaged with each other by surfaces thereof of a character to allow relatively ready engagement of these parts with, and disengagement thereof from, each other.

8. A valve according to claim 5, wherein said sleeve-like members, movable valve members, said nuts and said spindle are combined in a unit insertable into and removable from the valve casing through an opening of said casing, said member and the inwardly projecting annular flange of said casing being engaged with each other by surfaces thereof of a character to allow relatively ready engagement of these parts with, and disengagement thereof from, each other, said member being extended towards said opening of the valve casing and having an external flange to fit within that opening, and a cover plate for said opening adapted to hold said member in engagement with said annular flange.

9. A valve according to claim 5, wherein said sleeve-like members, movable valve members, said nuts and said spindle are combined in a unit insertable into and removable from the valve casing through an opening of said casing, said member and the inwardly projecting annular flange of said casing being engaged with each other by surface thereof of a character to allow relatively ready engagement of these parts with, and disengagement thereof from, each other, said member being extended towards said opening of the valve casing and having an external flange to fit within that opening, a cover plate for said opening adapted to hold said member in engagement with said annular flange and means embodied in said external flange to break connection of said member with said annular flange.

10. A valve according to claim 5, wherein the said movable valve members have surfaces at one end which mate in the closed position of the valve with seatings within the orifice of the inwardly projecting annular flange of the valve casing.

11. A valve according to claim 5, wherein the said movable valve members have surfaces at one end which mate in the closed position of the valve with seatings within the orifice of the inwardly projecting annular flange of the valve casing, and each said nut has an annular shoulder to engage its respective movable valve member, said annular shoulder being capable of a short free traverse with respect to said movable valve member at the beginning of the opening movement of such movable valve member.

12. A valve according to claim 5, wherein each said nut has an annular shoulder to engage its respective movable valve and each shoulder has a radial projection engaged with a guide provided in its said movable member while each movable valve member has a radial projection engaged with a guide of said sleve-like member to prevent rotation of the nuts and movable valve members.

13. A valve according to claim 5, comprising thrust ring and bearing means for the valve spindle disposed in a housing which is free to float to a limited extent axially of said spindle.

14. A valve according to claim 5, comprising cover means applied to the valve spindle over a thread part thereof, said cover means having adequate clearance for movement of fluid between said spindle and cover means.

15. A valve according to claim 5, wherein each of said nuts has a cylindrical extension to enclose the corresponding thread part of the valve spindle, each extension being closed at the end remote from the respective nut.

16. A valve according to claim 5, wherein the valve casing comprises a tubular section and a T-section with the inwardly projecting annular flange situated at the junction between said sections and the valve spindle passing across the head of the T-section and extending through an opening in the wall thereof, said casing comprising a cover plate applied to said opening and formed for passage of said spindle therethrough.

17. A valve according to claim 5, comprising means operated by the valve spindle and operative to indicate the condition of opening or closing of the valve.

18. A valve for segregating fluids in a pipe line, comprising a casing of circular section shaped at opposite ends to fit in the line, a flange formed internally of the casing and having a conical inner periphery, a sleeve-like member, of smaller diameter than the casing, having a coned fit to said periphery intermediately of its length and an external flange at one end fitted into an opening of the casing, a cover plate for said opening and embodying a seal for a valve spindle projecting through the cover plate, left-hand and right-hand threads on said spindle on opposite sides of the central plane of said internal flange, nuts engaging the respective threads, movable valve members engaged non-revolubly with said nuts and movable thereby over ports formed in said sleeve-like member on opposite sides of said plane, co-operative seating surfaces on said movable valve and sleeve-like members and adapted to separate the movable valve members by a narrow annular space when they are engaged with one another on the closing of the valve, said sleeve-like member and internal flange having radial passages communicating between said annular space and the outside of the casing, means fitted in and normally closing the outer ends of said passages, and thrust ring and bearing means applied to said spindle.

DONALD STUART DENHOLM FRASER.

REFERENCES CITED

The following references are of record in the file of this patent:

UNITED STATES PATENTS

| Number | Name | Date |
|---|---|---|
| 999,536 | Woodward | Aug. 1, 1911 |
| 2,059,078 | Allred | Oct. 27, 1936 |

FOREIGN PATENTS

| Number | Country | Date |
|---|---|---|
| 278,179 | Great Britain | of 1927 |